(12) United States Patent
Yamaguchi (10) Patent No.: US 9,097,356 B2
(45) Date of Patent: Aug. 4, 2015

(54) CHECK VALVE (75) Inventor: Kosei Yamaguchi, Yokohama (JP)

(73) Assignee: PIOLAX INC., Yokohama-Shi, Kanagawa (JP)

(*) Notice: Subject to any disclaimer, the term of this patent is extended or adjusted under 35 U.S.C. 154(b) by 0 days.

(21) Appl. No.: 14/241,805

(22) PCT Filed: Mar. 30, 2012

(86) PCT No.: PCT/JP2012/058524
§ 371 (c)(1),
(2), (4) Date: Feb. 27, 2014

(87) PCT Pub. No.: WO2013/031273
PCT Pub. Date: Mar. 7, 2013

(65) Prior Publication Data
US 2014/0216573 A1 Aug. 7, 2014

(30) Foreign Application Priority Data

Sep. 1, 2011 (JP) ................................. 2011-190297

(51) Int. Cl.
*F16K 17/196* (2006.01)
*F02M 37/20* (2006.01)
*B60K 15/035* (2006.01)
*F02M 37/00* (2006.01)

(52) U.S. Cl.
CPC ......... *F16K 17/196* (2013.01); *B60K 15/03519* (2013.01); *F02M 37/20* (2013.01); *B60K 2015/0358* (2013.01); *F02M 37/0029* (2013.01); *Y10T 137/778* (2015.04); *Y10T 137/7777* (2015.04)

(58) Field of Classification Search
CPC ............ F16K 17/196; B60K 15/03519; B60K 2015/0358; Y10T 137/7777
USPC .......... 137/493.3, 493.4, 493.5, 493.6, 493.9, 137/541, 542, 543
See application file for complete search history.

(56) References Cited

U.S. PATENT DOCUMENTS

| 1,229,885 | A | * | 6/1917 | Chadwick | .................. | 137/493.4 |
| 1,490,141 | A | * | 4/1924 | Stoms | ........................... | 417/504 |
| 1,497,063 | A | * | 6/1924 | Brehmer | .................... | 137/493.5 |

(Continued)

FOREIGN PATENT DOCUMENTS

JP 2011-141018 A 7/2011
WO WO 2011/064475 A1 6/2010

OTHER PUBLICATIONS

International Search Report (ISR) (PCT Form PCT/ISA/210), in PCT/JP2012/058524, dated May 15, 2012.

*Primary Examiner* — William McCalister
(74) *Attorney, Agent, or Firm* — McGinn IP Law Group, PLLC (57) ABSTRACT A check valve includes a casing including a positive pressure valve seat, a positive pressure valve urged by a positive pressure valve spring and including a negative pressure valve seat, and a negative pressure valve assembled to the positive pressure valve and urged by a negative pressure valve spring, where the positive pressure valve includes an inner cylinder, an outer cylinder that is connected with an outer circumference of the inner cylinder via ribs, and passages formed between the inner cylinder and the outer cylinder, where the positive pressure valve spring is disposed the casing and the outer cylinder, and where the negative pressure valve spring is disposed in the inner cylinder.

12 Claims, 7 Drawing Sheets

(56) References Cited

U.S. PATENT DOCUMENTS

| | | | |
|---|---|---|---|
| 2,000,431 A * | 5/1935 | Aumack | 137/73 |
| 2,072,271 A * | 3/1937 | Meadows | 137/541 |
| 2,191,636 A * | 2/1940 | Walker | 137/493.4 |
| 2,256,139 A * | 9/1941 | Craig | 62/145 |
| 2,628,810 A * | 2/1953 | Moore | 137/541 |
| 2,640,529 A * | 6/1953 | MacGlashan, Jr. | 137/68.23 |
| 2,700,488 A * | 1/1955 | Rafferty | 222/71 |
| 2,995,148 A * | 8/1961 | Novak et al. | 137/493.4 |
| 3,127,907 A * | 4/1964 | Novak | 137/493.6 |
| 3,131,718 A * | 5/1964 | Mingrone | 137/512.1 |
| 3,153,423 A * | 10/1964 | Biello et al. | 137/493.5 |
| 3,331,385 A * | 7/1967 | Taylor | 137/327 |
| 3,722,535 A * | 3/1973 | Raupp | 137/493.4 |
| 3,724,708 A * | 4/1973 | Burgess | 220/202 |
| 4,378,815 A * | 4/1983 | Mochida et al. | 137/43 |
| 4,498,493 A * | 2/1985 | Harris | 137/469 |
| 4,557,401 A * | 12/1985 | Hodge | 222/211 |
| 4,648,369 A * | 3/1987 | Wannenwetsch | 123/467 |
| 4,679,710 A * | 7/1987 | Jameson et al. | 222/190 |
| 4,926,902 A * | 5/1990 | Nakamura et al. | 137/493.3 |
| 4,971,093 A * | 11/1990 | Andersson | 137/541 |
| 5,127,313 A * | 7/1992 | Yonezawa | 91/447 |
| 5,183,075 A * | 2/1993 | Stein | 137/493.6 |
| 5,971,016 A * | 10/1999 | Wass et al. | 137/541 |
| 6,196,258 B1 * | 3/2001 | Araki et al. | 137/493.4 |
| 6,216,729 B1 * | 4/2001 | Hambly et al. | 137/493 |
| 6,470,911 B2 * | 10/2002 | Miura et al. | 137/592 |
| 6,581,633 B2 * | 6/2003 | Andersson | 137/541 |
| 6,695,007 B2 * | 2/2004 | Vicars | 137/541 |
| 6,877,525 B2 * | 4/2005 | Fischer et al. | 137/541 |
| 7,086,388 B2 * | 8/2006 | Roth et al. | 123/510 |
| 2011/0226356 A1 | 9/2011 | Yamaguchi | |

\* cited by examiner

CHECK VALVE

TECHNICAL FIELD

The present invention relates to a check valve for regulating the pressure within a fuel tank of an automobile or the like.

BACKGROUND ART

Conventionally, a check valve that prevents a fuel tank from bursting or the like by allowing a fuel vapor to flow to the outside when the pressure within the fuel tank rises to a certain value or higher, and prevents the fuel tank from being crushed or the like by allowing outside air to flow into the fuel tank from the outside of the fuel tank when the pressure within the fuel tank drops to a certain value or lower than the atmospheric pressure is mounted on a fuel tank of an automobile or the like.

Patent Document 1 discloses such conventional check valve including a main-casing, a sub-casing, a positive pressure valve and a negative pressure valve. The positive pressure valve and the negative pressure valve are slidably disposed in a valve chamber. The positive pressure valve includes a through hole and a negative pressure valve seat, while the negative pressure valve includes a leg portion to be inserted into the through hole. A cap to be engaged with the leg portion is disposed in the positive pressure valve. A positive pressure valve spring is disposed between the positive pressure valve and the sub-casing, while a negative pressure valve spring is disposed between the positive pressure valve and the cap. A positive pressure flow path allowing a fuel vapor to flow out is formed between an outer circumference of the positive pressure valve and an inner circumference of the main-casing, and disposed on the side outer than the positive pressure valve spring, while a negative pressure flow path allowing outside air to flow in is formed between an inner circumference of the positive pressure valve, and the leg portion and an outer circumference of the cap, and between the through hole and the leg portion, and disposed on the side outer than the negative pressure valve spring.

When the pressure within the fuel tank rises to a certain value or higher, the positive pressure valve is pressed by the fuel vapor and slides to be separated from a positive pressure valve seat against the urging force of the positive pressure valve spring, and the fuel vapor is discharged to the outside of the tank. On the other hand, when the pressure within the fuel tank drops to a certain value or lower, the negative pressure valve slides to be separated from the negative pressure valve seat against the urging force of the negative pressure valve spring, and the outside air is introduced into the fuel tank.

CITATION LIST

Patent Literature

Patent Document 1
WO-2010-064475-A

DISCLOSURE OF THE INVENTION

Problems to be Solved by the Invention

The positive pressure valve spring of Patent Document 1 is disposed such that one end of the positive pressure valve spring is supported by the inner circumference of the positive pressure valve while the other end is supported by the sub-casing. Thus, the positive pressure valve spring becomes smaller in diameter in comparison with the positive pressure valve, but higher in spring constant. However, when a spring that is smaller in diameter but higher in spring constant is used, the positive pressure valve may be inclined or may wobble such that it slides in a stable posture, thereby making it difficult to precisely set the spring force.

An object of the present invention is to provide a check valve that includes a positive pressure valve and a negative pressure valve, where the positive pressure valve is movable in a stable manner.

Means for Solving the Problem

To achieve the above-described object, the present invention provides a check valve including:
a casing having
one end communicating with an interior of a fuel tank,
the other end communicating with an exterior of the fuel tank,
a valve chamber formed at an interior of the casing, and
a positive pressure valve seat formed on a passage communicating with the interior of the fuel tank;
a positive pressure valve slidably disposed in the valve chamber, the positive pressure valve having
a penetrating passage penetrating through an interior of the positive pressure valve,
an opening portion formed on the penetrating passage at a side of the passage communicating with the fuel tank, and
a negative pressure valve seat formed on the opening portion,
the positive pressure valve being urged so as to be brought into contact with the positive pressure valve seat by a positive pressure valve spring disposed in the casing,
a negative pressure valve assembled to the positive pressure valve so as to open and close the negative pressure valve seat of the positive pressure valve,
the negative pressure valve being urged so as to be brought into contact with the negative pressure valve seat by a negative pressure valve spring disposed in the positive pressure valve,
wherein the positive pressure valve has
an inner cylinder in which the penetrating passage is formed, a circumference of an one-end opening of the inner cylinder being the negative pressure valve seat, an outer circumference of the negative pressure valve seat being a contact surface with the positive pressure valve seat,
a rib connected with an outer circumference of the inner cylinder,
an outer cylinder connected with the outer circumference of the inner cylinder via the rib, and
a passage formed between the inner cylinder and the outer cylinder,
wherein the positive pressure valve spring is disposed between an inner circumference of the casing and an outer circumference of the outer cylinder, such that one end thereof is supported by the casing while the other end thereof is supported by the outer cylinder, and
wherein the negative pressure valve spring is disposed in the inner cylinder.

There may be provided the check valve,
wherein a diameter of the negative pressure valve spring is larger than a diameter of the negative pressure valve seat.

There may be provided the check valve,
wherein the negative pressure valve has
a negative pressure valve main body having a head portion brought into contact with or separated from the negative pressure valve seat of the inner cylinder, a shaft portion extending from the head portion and is inserted into the inner cylinder through the negative pressure valve seat, and an engaging projecting portion formed on the shaft portion, and a retaining member having a cylinder portion into which the shaft portion of the negative pressure valve main body is inserted, an engaging lug extending from the cylinder portion so as to be engaged with the engaging projecting portion, and a spring supporting portion formed on an outer circumference of the cylinder portion, wherein a passage is formed between the shaft portion and the cylinder portion, and wherein one end of the negative pressure valve spring is supported by the inner cylinder of the positive pressure valve while the other end thereof is supported by the spring supporting portion.

Advantageous Effects of Invention

According to the present invention, the positive pressure valve is brought into contact with the positive pressure valve seat by the positive pressure valve spring, and thereby the passage that communicates with the interior of the fuel tank is closed under normal conditions. When the pressure within the fuel tank rises to a certain value or higher, the positive pressure valve slides to be separated from the positive pressure valve seat against the urging force of the positive pressure valve spring, and the fuel vapor and the like in the tank pass through the positive pressure valve seat inside of the casing, and flow to the outside of the tank through the passage between the passage between the inner cylinder and the outer cylinder of the positive pressure valve. At this time, being disposed between the inner circumference of the casing and the outer circumference of the outer cylinder, the positive pressure valve spring does not block a flow of the fuel vapor and the like when the fuel vapor and the like pass, so that the fuel vapor and the like can be discharged smoothly.

When the pressure within the fuel tank drops to a certain value or lower, the negative pressure valve is separated from the negative pressure valve seat against the urging force of the negative pressure valve spring, and the air and the like outside of the fuel tank flow into the fuel tank through the negative pressure valve seat.

Because the positive pressure valve spring is disposed between the inner circumference of the casing and the outer circumference of the outer cylinder, the diameter of the positive pressure valve spring can be increased, and as a result, the spring constant of the positive pressure valve can be kept low (this is because by increasing the diameter of the spring, a sufficient spring force can be secured even if the spring constant is lowered), which allows the positive pressure valve to slide in a stable manner.

BRIEF DESCRIPTION OF THE DRAWINGS

FIGS. 4A and 4B show a retaining member of a negative pressure valve that constitutes the check valve, where

BEST MODE FOR CARRYING OUT THE INVENTION

An exemplary embodiment of a check valve according to the present invention will be described with reference to the drawings.

Figure 1:
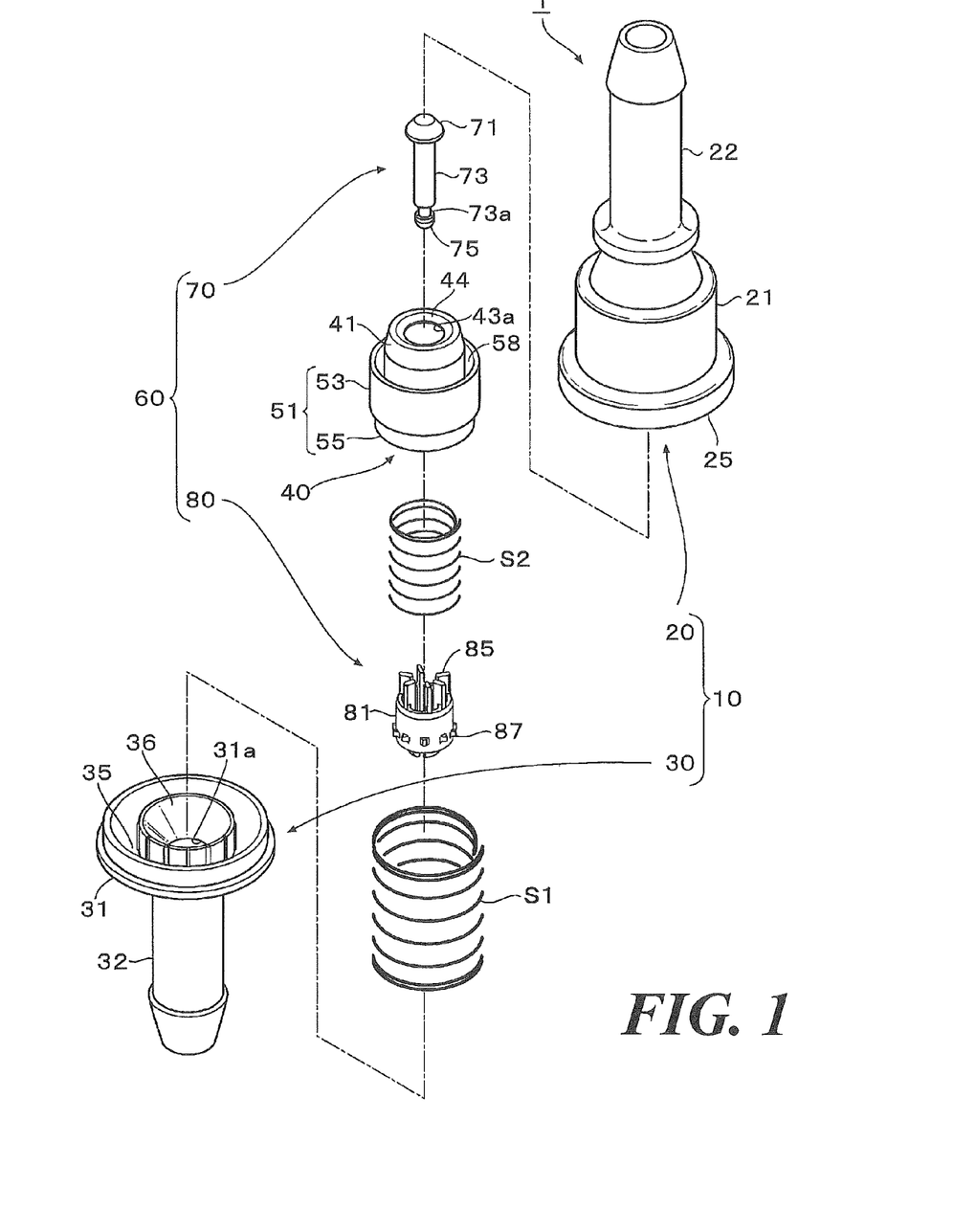
FIG. 1 is an exploded perspective view of a check valve according to the present invention.
Figure 2:
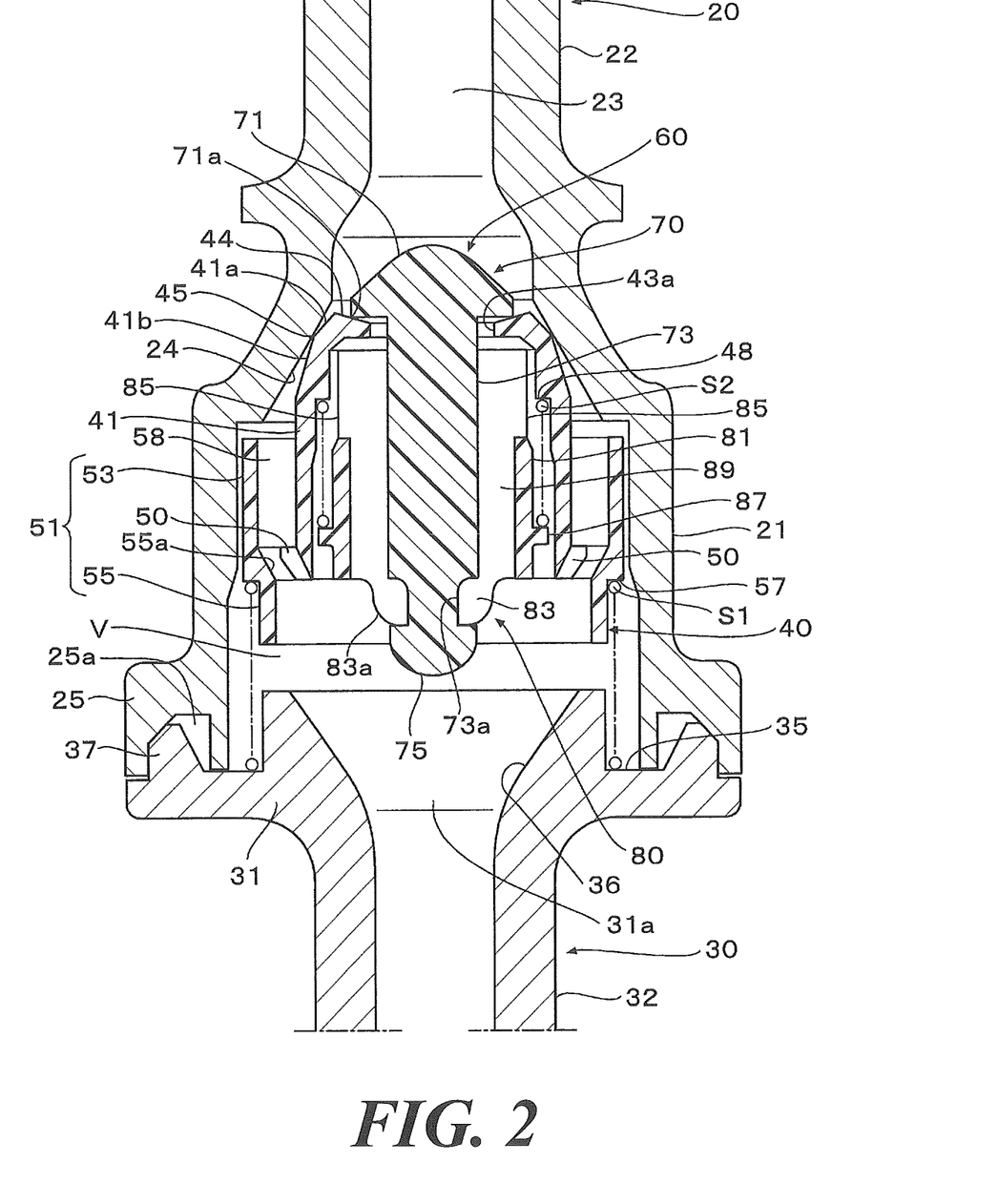
FIG. 2 is an enlarged vertical cross-sectional view of the check valve showing a relevant part.

As shown in FIGS. 1 and 2, this check valve 1 includes a casing 10, a positive pressure valve 40, a negative pressure valve 60, a positive pressure valve spring S1 and a negative pressure valve spring S2. The casing 10 includes a main-casing 20 and a sub-casing 30, and a valve chamber V is formed inside of the casing 10. The positive pressure valve 40 is slidably housed in the valve chamber V of the casing 10. The negative pressure valve 60 is assembled to the positive pressure valve 40. The positive pressure valve spring S1 urges the positive pressure valve 40 so as to bring the positive pressure valve 40 into contact with a positive pressure valve seat 24, which will be described later. Also, the negative pressure valve spring S2 urges the negative pressure valve 60 so as to bring the negative pressure valve 60 into contact with a negative pressure valve seat 44, which will be described later.

The main-casing 20 includes a cylinder body 21 having a cylindrical shape. From one end of the cylinder body 21, a connecting pipe 22 integrally extends. The other end of the cylinder body 21 is formed into an opening portion to which the sub-casing 30 is assembled. A pipe that communicates with the interior of a fuel tank is connected with an outer circumference of the connecting pipe 22, and the interior of the connecting pipe 22 forms a communicating passage 23 to the fuel tank. An inner circumferential surface of the base side of the connecting pipe 22 has a taper shape of gradually increasing in diameter toward the other-end opening portion of the cylinder body 21 to thereby form the positive pressure valve seat 24 such that the positive pressure valve 40 is brought into contact therewith or separated therefrom. A flange portion 25 having an annular shape is formed on an outer circumference of the other-end opening portion of the cylinder body 21, and an annular recess 25a is provided on an end face of the flange portion 25 which faces the sub-casing 30.

The sub-casing 30 is assembled to the other-end opening portion of the cylinder body 21 of the main-casing 20, and includes a lid body 31 and a connecting pipe 32. The lid body 31 has a disk shape, and an opening portion 31a is formed in the center of the lid body 31 so as to communicate with the exterior of the fuel tank. The connecting pipe 32 extends from the circumference on the side of an outer surface of the opening portion 31a. A non-illustrated external pipe that is connected with a canister or the like disposed outside of the fuel tank is connected with an outer circumference of the connecting pipe 32. An annular protrusion is formed on the circumference of the opening portion 31a of the lid body 31, and an annular groove is formed around the annular protrusion. A bottom of the annular groove forms a spring supporting portion 35 which supports one end of the positive pressure valve spring S1. An inner circumferential surface of the opening portion 31a forms a tapered surface 36 that gradually decreases in diameter from the side of the valve chamber V toward the connecting pipe 32. An annular projection 37 projects from a slightly inner side of an outer circumference of the lid body 31 so as to be engaged with the annular recess 25a of the flange portion 25 of the main-casing 20.

The positive pressure valve 40 disposed in the valve chamber V of the casing 10 includes an inner cylinder 41 and an outer cylinder 51 to have a double cylindrical shape. The inner cylinder 41 includes a passage 89 penetrating the interior thereof. The outer cylinder 51 is connected with an outer circumference of the inner cylinder 41 via ribs 50. Passages 58 are formed between the inner cylinder 41 and the outer cylinder 51.

The passage 89 of the inner cylinder 41 is largely open at an end portion on the side of the sub-casing 30 while it is open in its center at an end portion on the side of the connecting pipe 22 via an annular end face. A circumference of an opening 43a on the side of the connecting pipe 22 forms the negative pressure valve seat 44 such that the negative pressure valve 60 is brought into contact therewith or separated therefrom. The negative pressure valve seat 44 is formed into a taper shape of inclining such that its height gradually becomes lower from the outer circumference of the inner cylinder 41 toward the opening 43a.

Two inclined surfaces 41a, 41b that are different in angle are formed on an outer circumference of an end portion of the inner cylinder 41 at the side of the connecting pipe 22, and a corner portion between these inclined surfaces 41a, 41b forms a contact portion 45 that is brought into contact with or separated from the positive pressure valve seat 24 of the casing 10. A spring supporting step portion 48 is formed on an inner circumference of the inner cylinder 41 so as to support one end of the negative pressure valve spring S2.

Figure 3:
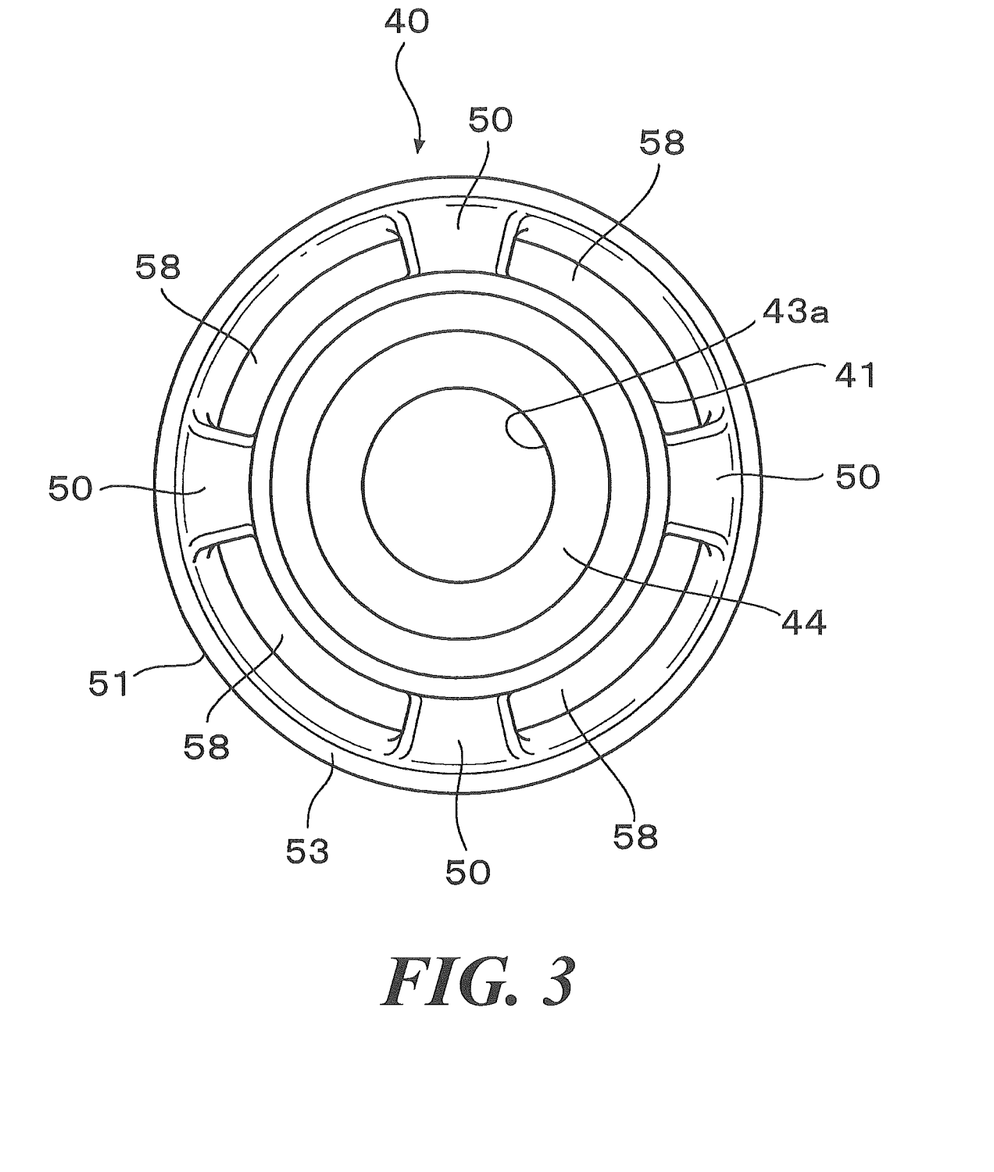
FIG. 3 is a plan view of a positive pressure valve that constitutes the check valve.

The outer cylinder 51 is formed into an approximately cylindrical shape that is larger in diameter than the inner cylinder 41 and open at both axial ends. The outer cylinder 51 has a large diameter cylinder portion 53 formed at the side of the connecting pipe 22, and the outer cylinder 51 formed at the side of the sub-casing 30. The small diameter cylinder portion 55 is smaller in diameter than the large diameter cylinder portion 53. A step portion between the large diameter cylinder portion 53 and the small diameter cylinder portion 55 forms a spring supporting step portion 57 which supports the other end of the positive pressure valve spring S1, and an outer circumference of the small diameter cylinder portion 55 forms a supporting surface which supports an inner circumference of the positive pressure valve spring S1. A tapered surface 55a is formed on an inner circumference of a connection portion between the small diameter cylinder portion 55 and the large diameter cylinder portion 53. The tapered surface 55a gradually becomes smaller in diameter toward the other end As shown in FIG. 3, the plural ribs 50 are disposed at even circumferential intervals so as to connect the inner cylinder 41 and the outer cylinder 51, and the passages 58 are formed between the inner cylinder 41 and the outer cylinder 51. The passages 58 constitute a flow path which allows a fuel vapor to flow to the outside when the pressure within the fuel tank rises to a certain value or higher, a detail of which will be described later (see FIG. 6).

The positive pressure valve spring S1 is formed larger in diameter than a sealing portion defined by the positive pressure valve seat 24 of the casing 10 and the contact portion 45 of the positive pressure valve 40. The one end of the positive pressure valve spring S1 is supported by the spring supporting portion 35 of the sub-casing 30, and the other end thereof is supported by the spring supporting portion 57 of the outer cylinder 51. Thus, the positive pressure valve spring S1 is disposed in the compressed state between an inner circumference of the casing 10 and an outer circumference of the outer cylinder 51, whereby the positive pressure valve 40 is urged toward the positive pressure valve seat 24 of the casing 10, and the contact portion 45 on an outer circumference of the positive pressure valve 40 is in contact with the positive pressure valve seat 24 under normal conditions (see FIG. 2). When the pressure within the fuel tank rises to a certain value or higher by a fuel vapor or the like, the positive pressure valve 40 is pressed to slide in the valve chamber V, and the contact portion 45 on the outer circumference of the positive pressure valve 40 is separated from the positive pressure valve seat 24 (see FIG. 6).

The negative pressure valve 60 to be assembled to the positive pressure valve 40 includes a valve member 70, and a retaining member 80 that is mounted on the valve member 70. The valve member 70 defines the "negative pressure valve main body" in the present invention.

As shown in FIG. 1, the valve member 70 includes a head portion 71 that is brought into contact with or separated from the negative pressure valve seat 44 of the inner cylinder 41, a shaft portion 73 that extends from the head portion 71 and is inserted into the inner cylinder 41 through the negative pressure valve seat 44, and an engaging projecting portion 75 that is formed at the distal end of the shaft portion 73.

The distal end of the head portion 71 is rounded while the outer circumference thereof expands obliquely outward like an umbrella. The base end of the head portion 71 at the rear surface thereof forms a contact portion 71a which is brought into contact with or separated from the negative pressure valve seat 44 of the positive pressure valve 40 (see FIG. 6 and FIG. 7). The shaft portion 73 extends vertically to a certain length from the center of the rear surface of the head portion 71. A distal end of the shaft portion 73 is decreased in diameter to form a depressed portion 73a, and the hemispherical engaging projecting portion 75 is connected with an end portion of the depressed portion 73a.

Figure 4A:
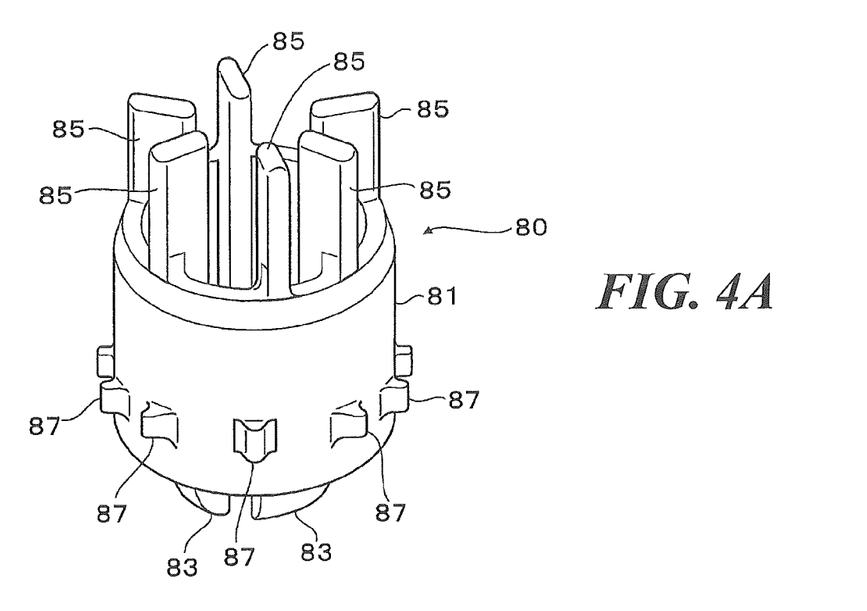
FIG. 4A is a perspective view of the retaining member that is seen obliquely from above.
Figure 4B:
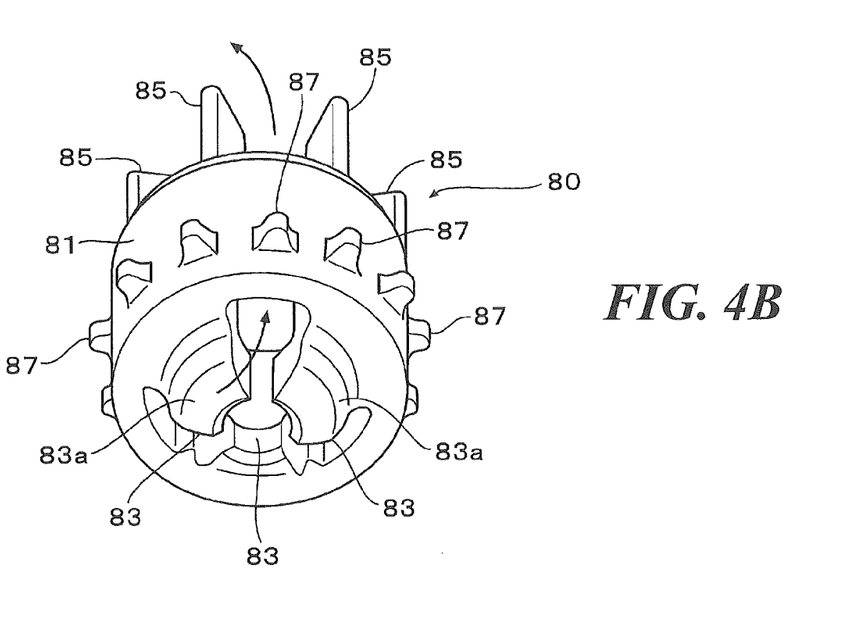
FIG. 4B is a perspective view of the retaining member that is seen obliquely from below.
Figure 5:
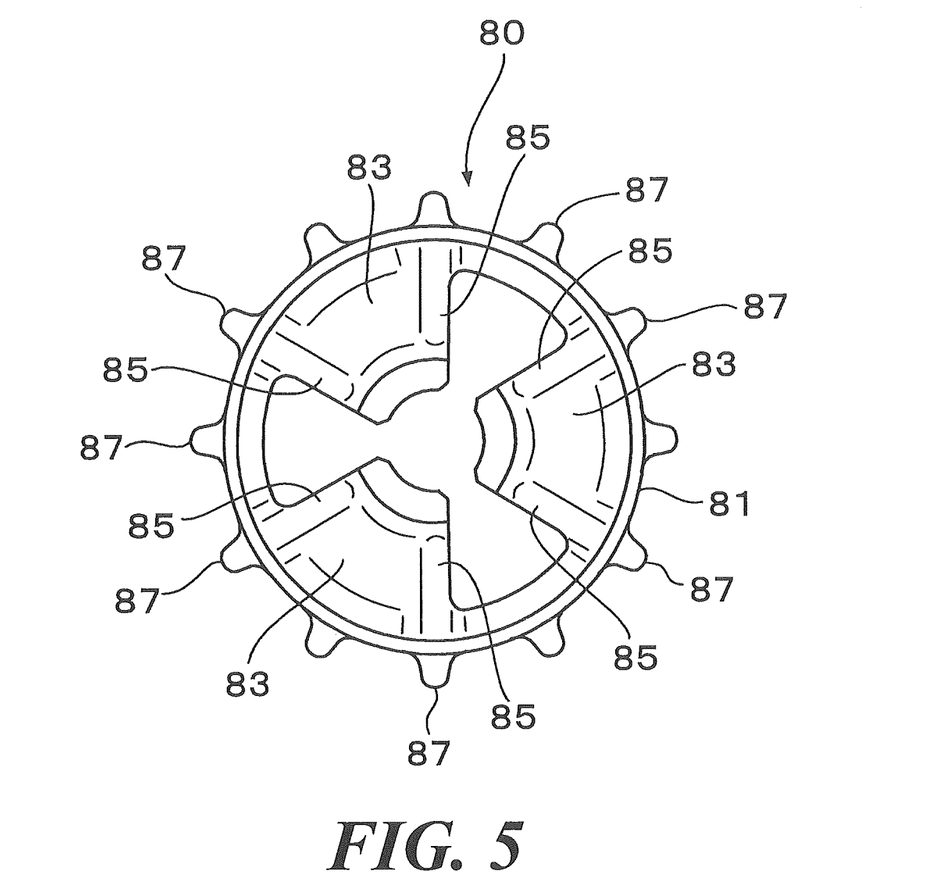
FIG. 5 is a plan view of the negative pressure valve.

As shown in FIG. 4 and FIG. 5, the retaining member 80 includes a cylinder portion 81 into which the shaft portion 73 of the valve member 70 is inserted, engaging lugs 83 that extend from the cylinder portion 81 and are engaged with the engaging projecting portion 75, and spring supporting portions 87 that are formed on an outer circumference of the cylinder portion 81.

The cylinder portion 81 has a circular cylindrical shape, and is provided with plural ribs 85 that project from an inner circumference of the cylinder portion 81 at even circumferential intervals. Each of the ribs 85 extends from a base end of the cylinder portion 81 and projects at a certain height beyond the distal end of the cylinder portion 81. And, each of the ribs 85 has a plate shape with a certain width of expanding toward the axial center of the cylinder portion 81. Each of the ribs 85 is brought into contact with an outer circumference of the shaft portion 73 so as to support the shaft portion 73 while the portion of each rib 85 that projects from the distal end of the cylinder portion 81 gets close to the inner circumference of the inner cylinder 41 of the positive pressure valve 40 to guide the sliding movement of the negative pressure valve 60 (see FIG. 6 and FIG. 7).

The plural engaging lugs 83 extend radial inward from the axial base end side of the cylinder portion 81 at even circumferential intervals (see FIG. 4B). As shown in FIG. 5, both sides of each of the engaging lugs 83 are matched with the ribs 85, 85, and the width of each of the engaging lugs 83 becomes gradually smaller toward the radial inward direction. Further, a distal end surface of each engaging lug 83 has an arc shape. An outer circumferential surface 83a of each engaging lug 83 has a curved surface shape (see FIG. 2). Thus, a distal end portion of each engaging lug 83 gets into the depressed portion 73a of the shaft portion 73, and the arc-shaped distal end surface is brought into contact with an outer circumference of the depressed portion 73a while being engaged with the engaging projecting portion 75.

The plural spring supporting portions 87 radially project in a radial fashion at even circumferential intervals on the outer circumference on the side of the base end of the cylinder portion 81 so as to support the other end of the negative pressure valve spring S2 while getting close to the inner circumference of the inner cylinder 41 of the positive pressure valve 40 to guide of the sliding movement of the negative pressure valve 60.

When the engaging lugs 83 is engaged with the engaging projecting portion 75 to assemble the retaining member 80 to the valve member 70 and the negative pressure valve 60 is constituted, the passage 89 is formed between the shaft portion 73 of the valve member 70 and the cylinder portion 81 of the retaining member 80 while being partitioned by the plural ribs 85 (see FIG. 2).

The negative pressure valve spring S2 is formed larger in diameter than a sealing portion defined by the negative pressure valve seat 44 of the positive pressure valve 40 and the contact portion 71a of the valve member 70. The one end of the negative pressure valve spring S2 is supported by the spring supporting step portion 48 of the positive pressure valve 40, and the other end thereof is supported by the spring supporting portions 87 of the retaining member 80. Thus, the negative pressure valve spring S2 is disposed in the compressed state inside of the inner cylinder 41 of the positive pressure valve 40, whereby the negative pressure valve 60 is urged toward the positive pressure valve 40, and the contact portion 71a of the valve member 70 is in contact with the negative pressure valve seat 44 of the positive pressure valve 40 under normal conditions (see FIG. 2). When the pressure within the fuel tank drops to a certain value or lower compared with the atmospheric pressure, the negative pressure valve 60 is pressed by outside air and slides with respect to the positive pressure valve 40 against the urging force of the negative pressure valve spring S2, and the contact portion 71a of the negative pressure valve 60 is separated from the negative pressure valve seat 44 (see FIG. 7).

As a result, as shown in FIG. 4B, the outside air from the outside of the fuel tank flows into the cylinder portion 81 from the clearance between the engaging lugs 83, 83, passes through the passage 89, and flows out of the clearance between the contact portion 71a of the negative pressure valve 60 and the negative pressure valve seat 44 into the connecting pipe 22.

Next, an exemplary assembling process of the above-described check valve 1 will be described. First, the negative pressure valve spring S2 is disposed on an outer circumference of the retaining member 80. While the other end of the negative pressure valve spring S2 is supported by the spring supporting portions 87, the retaining member 80 is inserted into the positive pressure valve 40, and the one end of the negative pressure valve spring S2 is supported by the spring supporting step portion 48 on an inner circumference of the positive pressure valve 40. In this state, the shaft portion 73 of the valve member 70 of the negative pressure valve 60 is inserted from the opening 43a on an inner circumference of the negative pressure valve seat 44 of the positive pressure valve 40, and the inserted axial portion 73 further moves through the inside of the cylinder portion 81 while being guided by the plural ribs 85. The engaging lugs 83 are pressed and expanded by the engaging projecting portion 75, and after the depressed portion 73a of the shaft portion 73 reaches the engaging lugs 83, the engaging lugs 83 flexibly return such that the distal end portions of the engaging lugs 83 get into the depressed portion 73a, thereby being engaged with the engaging projecting portion 75. As a result, the valve member 70 and the retaining member 80 are coupled together, and the negative pressure valve spring S2 is held in the compressed state, whereby the negative pressure valve 60 is slidably assembled to the positive pressure valve 40.

In the present embodiment, the negative pressure valve 60 can be slidably assembled to the positive pressure valve 40 while retaining the negative pressure valve spring S2, by a simple operation of only inserting the shaft portion 73 into the opening 43a on the inner circumference of the negative pressure valve seat 44 to engage the engaging projecting portion 75 with the engaging lugs 83. Thus, workability of assembling the negative pressure valve 60 to the positive pressure valve 40 can be improved.

Because the plural ribs 85 formed on the inner circumference of the cylinder portion 81 of the retaining member 80 are in contact with and hold the outer circumference of the shaft portion 73 of the valve member 70. Thus, the valve member 70 and the retaining member 80 can be coupled together tightly. Further, the passage 89 to allow outside air to flow in when the pressure within the fuel tank drops can be reliably formed between the shaft portion 73 of the valve member 70 and the cylinder portion 81 of the retaining member 80. The plural engaging lugs 83 project inward at even intervals from the outer circumference of the cylinder portion 81 of the retaining member 80, and get into the depressed portion 73a of the shaft portion 73 to be engaged with the engaging projecting portion 75, the shaft portion 73 can be equally held with balance.

The two valves having been assembled are housed to the fuel tank of the main-casing 20 such that the side of the negative pressure valve 60 is oriented toward the communicating passage 23. Then, while the one end of the positive pressure valve spring S1 is supported by the spring supporting portion 35 of the sub-casing 30, the other end of the positive pressure valve spring S1 is supported by the spring supporting step portion 57 of the outer cylinder 51 of the positive pressure valve 40. Further, the sub-casing 30 is pressed toward the main-casing 20 against the urging force of the positive pressure valve spring S1. After the annular projection 37 of the sub-casing 30 is engaged with the annular recess 25a of the main-casing 20, the circumferences of the engaged portions are bonded to each other by ultrasonic bonding, an adhesion bond or the like, whereby the sub-casing 30 can be assembled to the main-casing 20.

Next, the action and effect of the above-described check valve 1 will be described.

The check valve 1 is disposed inside or outside of the fuel tank by a clip, a bracket or the like which are not illustrated, in a state where a pipe disposed inside of the fuel tank and coupled together with a cut valve or the like may be connected to the connection portion 22 of the main-casing 20 and a pipe disposed outside of the fuel tank and coupled together with a canister or the like may be connected to the connecting pipe 32 of the sub-casing 30.

When the pressure within the fuel tank is at a certain value or lower, the contact portion 45 of the positive pressure valve 40 is in contact with the positive pressure valve seat 24 to close the communicating passage 23 to the fuel tank by the urging force of the positive pressure valve spring S1, and the contact portion 71a of the valve member 70 is in contact with the negative pressure valve seat 44 to close the opening 43a by the urging force of the negative pressure valve spring S2 applied to the retaining member 80 that is coupled together with the valve member 70, as shown in FIG. 2.

Figure 6:
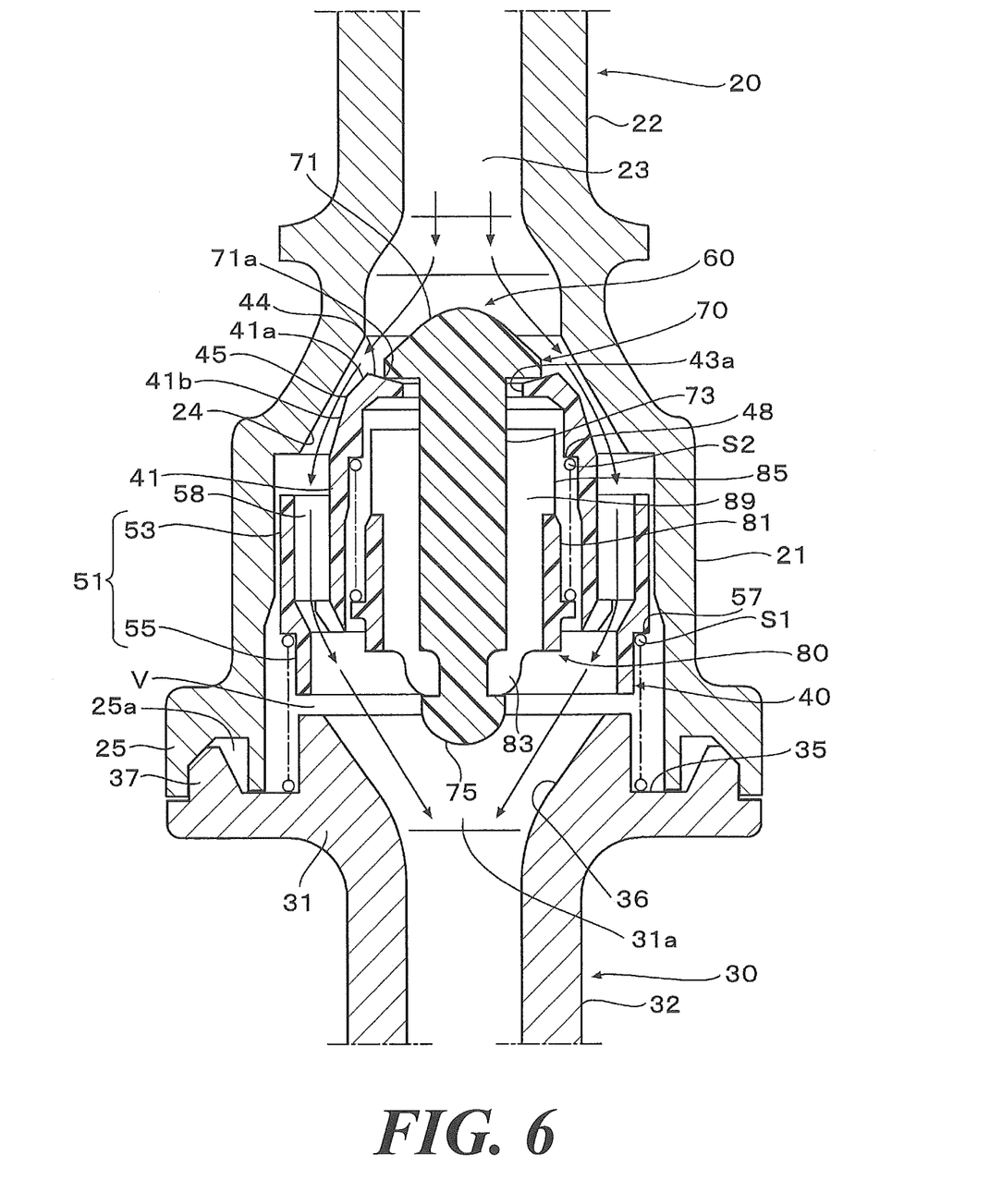
FIG. 6 is an enlarged cross-sectional view of the check valve showing a relevant part in a state where the pressure within a fuel tank rises to a certain value or higher.

When the pressure within the fuel tank rises to a certain value or higher, as shown in FIG. 6, a fuel vapor and the like pass through the communicating passage 23 to the fuel tank to press the positive pressure valve 40, and the positive pressure valve 40 slides toward the sub-casing 30 against the urging force of the positive pressure valve spring S1, whereby the contact portion 45 on the outer circumference of the positive pressure valve 40 is separated from the positive pressure valve seat 24. Then, as indicated with the arrows in FIG. 6, the fuel vapor flows through the passages 58 between the inner cylinder 41 and the outer cylinder 51 while flowing along the tapered surface 36 of the spring supporting portion 35 of the sub-casing 30, flows into the opening portion 31a of the sub-casing 30, and is sent to a canister or the like via the connection portion 22 and the non-illustrated pipe to be discharged to the outside of the fuel tank, which allows the pressure within the fuel tank to drop.

In this check valve 1, the positive pressure valve spring S1 is disposed between the inner circumference of the casing 10 and the outer circumference of the outer cylinder 51. While the passages 58 through which a fuel vapor flows are formed between the inner cylinder 41 and the outer cylinder 51 of the positive pressure valve 40, and the passages 58 are provided on the side inner than the positive pressure valve spring S1. As a result, the fuel vapor and the like bypasses the positive pressure valve spring S1, such that the positive pressure valve spring S1 does not impede flowing of the fuel vapor and the like. Thus, the fuel vapor and the like can be discharged smoothly to the outside of the fuel tank while vibrations or fluctuations of the pressure valve 40 urged by the positive pressure valve spring S1 can be minimized, thereby reducing an operating noise generated due to sliding in the valve chamber V.

Because it is disposed between the inner circumference of the casing 10 and the outer circumference of the outer cylinder 51, the positive pressure valve spring S1 in this check valve 1 can be increased in diameter to obtain an elastic urging force sufficient to bring the pressure valve 40 into contact with the positive pressure valve seat 24 even if the spring constant of the positive pressure valve spring S1 is low. As a result, compared with a case where a pressure valve is urged by a positive pressure valve spring that is small in diameter but has a high spring constant, the elastic urging force of the positive pressure valve spring S1 can be set and adjusted more easily, and the positive pressure valve 40 can be prevented from being inclined or wobbling, and can slide in a stable posture to thereby be brought into contact with the positive pressure valve seat 24 with an excellent sealing property.

Further, in the present embodiment, because the tapered surface 55a is formed on the inner circumference of the outer cylinder 51 of the positive pressure valve 40, the fuel vapor and the like can flow smoothly inside the passages 58 formed between the inner cylinder 41 and the outer cylinder 51. Because the inner circumferential surface of the spring supporting portion 35 and the inner circumferential surface of the opening portion 31a of the sub-casing 30 form the tapered surface 36, the tapered surface 36 guides the fuel vapor and the like so as to flow out smoothly toward the opening portion 31a. Because the small diameter cylinder portion 55 of the outer cylinder 51 is disposed on the inner circumference at the other end of the positive pressure valve spring S1, the positive pressure valve spring S1 can be supported from the inner circumference side, and turbulence generated by the fuel vapor and the like flowing inside and coming into contact with the positive pressure valve spring S1 can be prevented.

Figure 7:
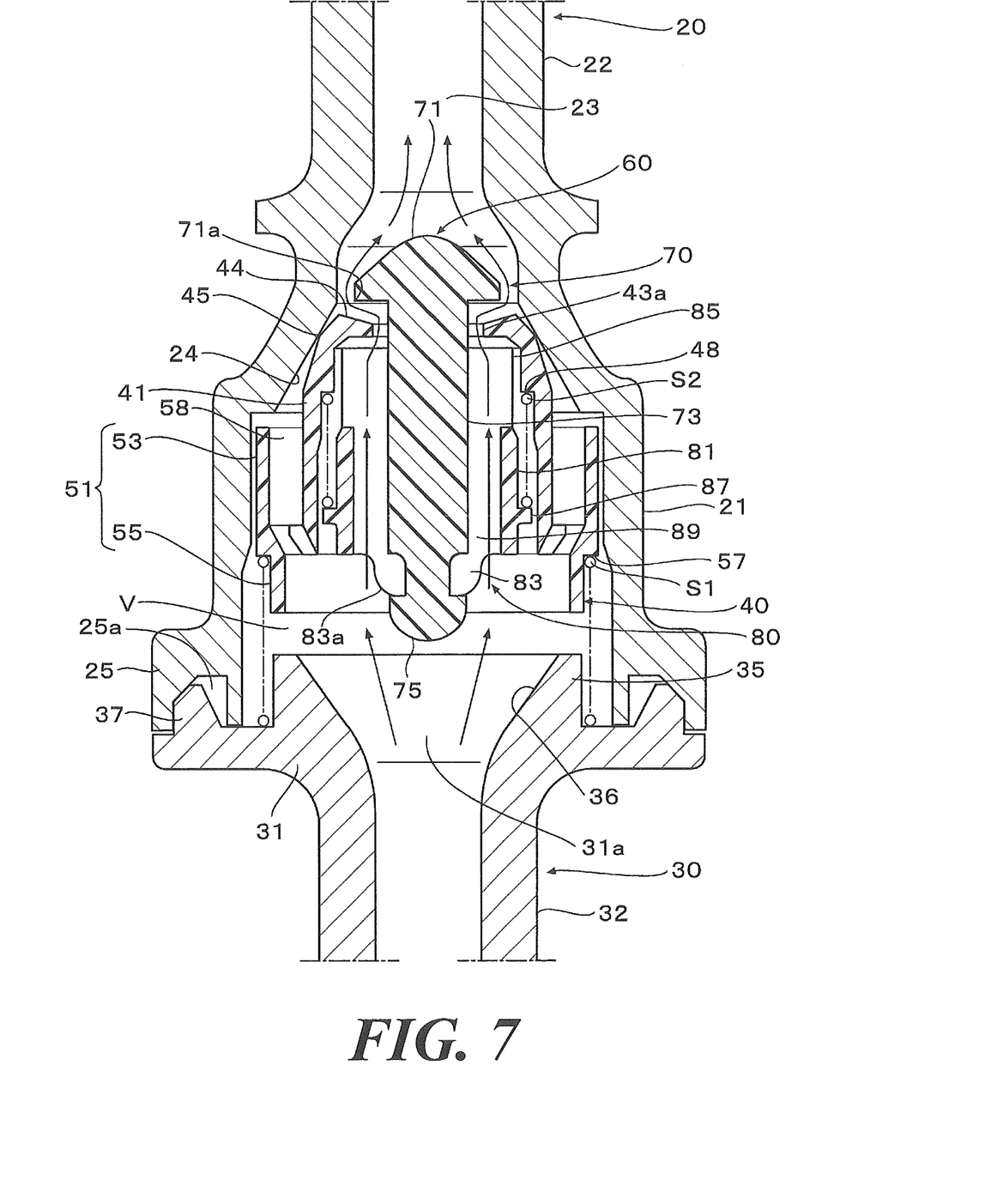
FIG. 7 is an enlarged cross-sectional view of the check valve showing a relevant part in a state where the pressure within the fuel tank is put under a negative pressure by a certain value or more compared with the atmospheric pressure.

When the pressure within the fuel tank drops to a certain value or lower compared with the atmospheric pressure, outside air passes through the opening portion 31a via the connecting pipe 32 on the side of the sub-casing 30 and is introduced into the valve chamber V of the casing 10. Then, as shown in FIG. 7, the negative pressure valve 60 is pressed by the outside air and slides toward the communicating passage 23 to the fuel tank of the main-casing 20 against the urging force of the negative pressure valve spring S2, whereby the contact portion 71a of the valve member 70 of the negative pressure valve 60 is separated from the negative pressure valve seat 44 of the positive pressure valve 40. Then, as indicated with the arrows in FIG. 7, the outside air flows into the cylinder portion 81 from the clearance between the engaging lugs 83, 83 of the retaining member 80, passes through the passage 89 formed between the shaft portion 73 and the cylinder portion 81, passes through the communicating passage 23 to the fuel tank from the clearance between the contact portion 71a of the negative pressure valve 60 and the negative pressure valve seat 44, and flows into the fuel tank via the non-illustrated pipe, which allows the pressure within the fuel tank to rise.

The negative pressure valve spring S2 is disposed in the inner cylinder 41 of the positive pressure valve 40 such that one end thereof is supported by the spring supporting step portion 48 of the inner cylinder 41 and the other end thereof is supported by the spring supporting portions 87 of the negative pressure valve 60. While the passage 89 through which the outside air flows is formed between the shaft portion 73 of the valve member 70 and the cylinder portion 81 of the retaining member 80, the passage 89 is disposed on the side inner than the negative pressure valve spring S2. As a result, the outside air bypasses the negative pressure valve spring S2, such that the negative pressure valve spring S2 does not impede flowing of the outside air. Thus, the outside air can be introduced smoothly into the fuel tank while vibrations or fluctuations of the negative pressure valve 60 urged by the negative pressure valve spring S2 can be minimized, thereby reducing an operating noise generated due to sliding.

Because the negative pressure valve spring S2 is formed larger than the negative pressure valve seat 44, that is, formed larger in diameter than the sealing portion defined by the negative pressure valve seat 44 of the positive pressure valve 40 and the contact portion 71a of the valve member 70 of the negative pressure valve 60, an elastic urging force to urge the negative pressure valve 40 can be secured sufficiently even if the spring constant of the negative pressure valve spring S2 is low. As a result, the negative pressure valve 60 can slide in a stable posture to thereby be reliably brought into contact with the negative pressure valve seat 44.

Further, in the present embodiment, the engaging projecting portion 75 of the valve member 70 has a hemispherical shape while the outer circumferential surfaces 83a of the engaging lugs 83 of the retaining member 80 that are engaged with the engaging projecting portion 75 have a curved surface shape, which can decrease the flowing resistance for the outside air and allow the outside air to flow smoothly into the cylinder portion 81 from the clearance between the engaging lugs 83, 83. Each of the engaging lugs 83 is disposed such that both the sides are disposed so as to be matched with the ribs 85, 85 (see FIG. 5), which allows the outside air to flow smoothly into the cylinder portion 81 from the clearance between the engaging lugs 83, 83 and flow smoothly out from the clearance between the ribs 85, 85 through the passage 89.

REFERENCE SINGS LIST

1 Check valve
10 Casing
23 Communicating passage to a fuel tank
24 Positive pressure valve seat
40 Positive pressure valve
41 Inner cylinder
43a Opening
44 Negative pressure valve seat
50 Rib
51 Outer cylinder
58 Passage
60 Negative pressure valve
70 Valve member (Negative pressure valve main body)
71 Head portion
73 Shaft portion
75 Engaging projecting portion
80 Retaining member
81 Cylinder portion
83 Engaging lug
87 Spring supporting portion
89 Passage
S1 Positive pressure valve spring
S2 Negative pressure valve spring
V Valve chamber

The invention claimed is:

1. A check valve capable of being mounted on a fuel tank, the check valve comprising:
   a casing including:
      a valve chamber formed in an interior of the casing;
      a first end communicating with the valve chamber, the first end to be connected to an interior of the fuel tank to thereby communicate between the valve chamber and the interior of the fuel tank;
      a second end communicating with the valve chamber, the second end to be connected to an exterior of the fuel tank to thereby communicate between the valve chamber and the exterior of the fuel tank; and
      a positive pressure valve seat formed in the valve chamber at a side of the first end;
   a positive pressure valve slidably disposed in the valve chamber, the positive pressure valve including:
      an inner cylinder through which a penetrating passage penetrates an opening portion being formed on the inner cylinder at a side of the first end of the casing so as to be communicated with the penetrating passage;
      a negative pressure valve seat formed on a circumference of the opening portion;
      a contact surface formed on an outer circumference of the negative pressure valve seat and brought into contact with or separated from the positive pressure valve seat;
      a rib extending from an outer circumference of the inner cylinder; and
      an outer cylinder disposed outwardly of the inner cylinder and connected with the outer circumference of the inner cylinder via the rib so as to define a passage formed between the inner cylinder and the outer cylinder;
   a positive pressure valve spring disposed in the casing to urge the positive pressure valve so as to be brought into contact with the positive pressure valve seat;
   a negative pressure valve assembled to the positive pressure valve so as to open and close the negative pressure valve seat of the positive pressure valve; and
   a negative pressure valve spring disposed in the positive pressure valve to urge the negative pressure valve so as to be brought into contact with the negative pressure valve seat,
   wherein the positive pressure valve spring is disposed between an inner circumference of the casing and an outer circumference of the outer cylinder, such that one end of the positive pressure valve spring is supported by the casing while the other end of the positive pressure valve spring is supported by the outer cylinder,
   wherein the negative pressure valve spring is disposed in the inner cylinder, and
   wherein the negative pressure valve seat is defined on an outer surface of the inner cylinder of the positive pressure valve.

2. The check valve of claim 1,
   wherein a diameter of the negative pressure valve spring is larger than a diameter of the negative pressure valve seat.

3. A check valve capable of being mounted on a fuel tank, the check valve comprising:
   a casing including:
      a valve chamber formed in an interior of the casing;
      a first end communicating with the valve chamber, the first end to be connected to an interior of the fuel tank to thereby communicate between the valve chamber and the interior of the fuel tank;
      a second end communicating with the valve chamber, the second end to be connected to an exterior of the fuel tank to thereby communicate between the valve chamber and the exterior of the fuel tank; and
      a positive pressure valve seat formed in the valve chamber at a side of the first end;
   a positive pressure valve slidably disposed in the valve chamber, the positive pressure valve including:
      an inner cylinder through which a penetrating passage penetrates an opening portion being formed on the inner cylinder at a side of the first end of the casing so as to be communicated with the penetrating passage;
      a negative pressure valve seat formed on a circumference of the opening portion;
      a contact surface formed on an outer circumference of the negative pressure valve seat and brought into contact with or separated from the positive pressure valve seat;
      a rib extending from an outer circumference of the inner cylinder;
      an outer cylinder disposed outwardly of the inner cylinder and connected with the outer circumference of the inner cylinder via the rib so as to define a passage formed between the inner cylinder and the outer cylinder;
   a positive pressure valve spring disposed in the casing to urge the positive pressure valve so as to be brought into contact with the positive pressure valve seat;
   a negative pressure valve assembled to the positive pressure valve so as to open and close the negative pressure valve seat of the positive pressure valve; and
   a negative pressure valve spring disposed in the positive pressure valve to urge the negative pressure valve so as to be brought into contact with the negative pressure valve seat, wherein the positive pressure valve spring is disposed between an inner circumference of the casing and an outer circumference of the outer cylinder, such that one end of the positive pressure valve spring is supported by the casing while the other end of the positive pressure valve spring is supported by the outer cylinder, wherein the negative pressure valve spring is disposed in the inner cylinder, wherein the negative pressure valve includes
   a negative pressure valve main body having
      a head portion brought into contact with or separated from the negative pressure valve seat of the inner cylinder,
      a shaft portion extending from the head portion and is inserted into the inner cylinder through the negative pressure valve seat, and
      an engaging projecting portion formed on the shaft portion; and
   a retaining member having
      a cylinder portion into which the shaft portion of the negative pressure valve main body is inserted,
      an engaging lug extending from the cylinder portion so as to be engaged with the engaging projecting portion, and
      a spring supporting portion formed on an outer circumference of the cylinder portion, wherein a passage is formed between the shaft portion and the cylinder portion, and wherein one end of the negative pressure valve spring is supported by the inner cylinder of the positive pressure valve while the other end thereof is supported by the spring supporting portion.

4. The check valve of claim 3,
wherein, in the negative pressure valve, the shaft portion of the negative pressure valve main body of the negative pressure valve includes a depressed portion at a base end side with respect to the engaging projecting portion, whereas the engaging lug of the retaining member is outwardly deflectable, and wherein, upon inserting the shaft portion of the negative pressure valve main body into the cylinder portion of the retaining member, the engaging projecting portion outwardly pushes the engaging lug, and thereafter, the engaging lug inwardly returns and enters into the depressed portion, thereby engaging the negative pressure valve main body and the retaining member.

5. A check valve capable of being mounted on a fuel tank, the check valve comprising:
   a casing including:
      a valve chamber formed in an interior of the casing
      a first end communicating with the valve chamber, the first end to be connected to an interior of the fuel tank to thereby communicate between the valve chamber and the interior of the fuel tank;
      a second end communicating with the valve chamber, the second end to be connected to an exterior of the fuel tank to thereby communicate between the valve chamber and the exterior of the fuel tank; and
      a positive pressure valve seat formed in the valve chamber at a side of the first end;
   a positive pressure valve slidably disposed in the valve chamber, the positive pressure valve including:
      an inner cylinder through which a penetrating passage penetrates an opening portion being formed on the inner cylinder at a side of the first end of the casing so as to be communicated with the penetrating;
      a negative pressure valve seat formed on a circumference of the opening portion;
      a contact surface formed on an outer circumference of the negative pressure valve seat and brought into contact with or separated from the positive pressure valve seat;
      a rib extending from an outer circumference of the inner cylinder;
      an outer cylinder disposed outwardly of the inner cylinder and connected with the outer circumference of the inner cylinder via the rib so as to define a passage formed between the inner cylinder and the outer cylinder, and
   a positive pressure valve spring disposed in the casing to urge the positive pressure valve so as to be brought into contact with the positive pressure valve seat;
   a negative pressure valve assembled to the positive pressure valve so as to open and close the negative pressure valve seat of the positive pressure valve,
   a negative pressure valve spring disposed in the positive pressure valve to urge the negative pressure valve so as to be brought into contact with the negative pressure valve seat,
   wherein the positive pressure valve spring is disposed between an inner circumference of the casing and an outer circumference of the outer cylinder, such that one end of the positive pressure valve spring is supported by the casing while the other end of the positive pressure valve spring is supported by the outer cylinder,
   wherein the negative pressure valve spring is disposed in the inner cylinder, and
   wherein, when viewed in a direction perpendicular to an axis of the negative pressure valve, the inner cylinder and the outer cylinder overlap with each other.

6. The check valve of claim 1, wherein the positive pressure valve spring directly contacts the casing at a point where the positive pressure valve spring is supported by the casing.

7. The check valve of claim 1, wherein the second end of the casing further comprises:
   a lid body have a disk shape; and
   a connecting pipe,
   wherein a second opening portion is formed in a center of the lid body so as to communicate with the exterior of the fuel tank,
   wherein an annular protrusion is formed on a circumference of the second opening portion of the lid body,
   wherein an annular groove is formed around the annular protrusion, and
   wherein a bottom of the annular groove forms a spring supporting portion which supports the one end of the positive pressure valve spring.

8. The check valve of claim 1, wherein the second end of the casing further comprises a spring supporting portion which supports the one end of the positive pressure valve spring.

9. The check valve of claim 1, wherein the negative pressure valve seat comprises an inclined taper cross section such that a height becomes less from an outer circumference of an inner cylinder toward the opening.

10. The check valve of claim 1, wherein the outer cylinder includes:
   a large diameter cylinder portion;
   a small diameter cylinder portion which has a diameter less than a diameter of the large diameter cylinder portion and is disposed at closer to the second end of the casing than the large diameter cylinder portion.

11. The check valve of claim 10, further comprising a spring supporting step portion formed by a step portion disposed between the large diameter cylinder portion and the small diameter cylinder portion, the spring supporting step portion supports the other end of the positive pressure valve spring.

12. The check valve of claim 10, wherein an outer circumference of the small diameter cylinder portion has a supporting surface which supports an inner circumference of the positive pressure valve spring.

* * * * *